(12) United States Patent
Papadopoulos et al.

(10) Patent No.: US 6,617,446 B1
(45) Date of Patent: Sep. 9, 2003

(54) COLD WATER SWELLABLE STARCHES EXHIBITING DELAYED VISCOSITY DEVELOPMENT, PREPARATION AND USE THEREOF

(75) Inventors: Andreas L. Papadopoulos, Plainsboro, NJ (US); Douglas J. Hanchett, Wharton, NJ (US); Peter T. Trzasko, Plainsboro, NJ (US); David C. Rawlins, Piscataway, NJ (US); Vincent R. Green, North Plainfield, NJ (US); Paul A. Altieri, Belle Mead, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/325,062

(22) Filed: Jun. 3, 1999

(51) Int. Cl.⁷ .................. C08B 31/00; A61K 31/715
(52) U.S. Cl. ...................................... 536/102; 514/60
(58) Field of Search ............................. 536/102; 514/60

(56) References Cited

U.S. PATENT DOCUMENTS

| | | | |
|---|---|---|---|
| 2,464,081 A | 3/1949 | Hansen et al. | 127/32 |
| 3,137,592 A | 6/1964 | Protzman et al. | 127/32 |
| 3,159,505 A | 12/1964 | Burgess et al. | 127/32 |
| 3,196,044 A | 7/1965 | Kott et al. | 127/23 |
| 3,622,677 A | 11/1971 | Short et al. | 424/361 |
| 4,072,535 A | 2/1978 | Short et al. | 106/210 |
| 4,219,646 A | 8/1980 | Rubens | 536/109 |

FOREIGN PATENT DOCUMENTS

| | | | |
|---|---|---|---|
| EP | 0 384 124 | 8/1990 | A23L/1/052 |
| EP | 0 787 437 | 8/1997 | A23P/1/02 |
| EP | 0 796 567 | 9/1997 | A23P/1/02 |
| GB | 1240404 A | * 7/1971 | |

OTHER PUBLICATIONS

Kratz, R. O. et al., "Instant Pectins—The Innovative Pectin Technology", Gordian, 12 (1994), pp. 189–191. (Translation).

* cited by examiner

Primary Examiner—James O. Wilson
Assistant Examiner—Everett White
(74) Attorney, Agent, or Firm—David LeCroy

(57) ABSTRACT

The present invention is directed to cold water swellable starches exhibiting delayed viscosity development, preparation and use thereof. The cold water swellable starches are prepared using methods known in the art and then are compacted. These starches provide all the advantages of CWS starch, including texture, heavy body, glossy sheen, and viscosity. However, the rate of hydration may be controlled to delay viscosity development. Such starches may be used for a variety of industrial applications including food products, personal care products, cleansers, liquid detergents and fabric softeners, oil-well drilling, and paints and allow for easier processing of such products.

17 Claims, No Drawings

COLD WATER SWELLABLE STARCHES EXHIBITING DELAYED VISCOSITY DEVELOPMENT, PREPARATION AND USE THEREOF

BACKGROUND OF THE INVENTION

The present invention relates to cold water swellable starches exhibiting delayed viscosity development, preparation and use thereof.

Cold water swellable (CWS) starches are known in the art and are to used for a variety of purposes, particularly in instant food products such as soups and gravies. One important attribute of these CWS starches is that they quickly hydrate to add viscosity to the food product. Unfortunately, this quick hydration is disadvantageous to the commercial preparation of many foods as a viscous solution is harder to process in many ways, such as pumping, mixing, adding other ingredients, and homogenizing.

Surprisingly, it has now been discovered that compaction of CWS starches provides all the advantages of such starches except that the rate of starch hydration may be controlled which aids in the reduction of lump formation. This adds the further advantage of controlled viscosity development, allowing for easier product processing.

SUMMARY OF THE INVENTION

The present invention is directed to cold water swellable starches exhibiting delayed viscosity development, preparation and use thereof. The cold water swellable starches are prepared using methods known in the art and then are compacted. These starches provide all the advantages of CWS starch, including texture, heavy body, glossy sheen, and viscosity. However, the rate of hydration may be controlled to delay viscosity development and reduce lump formation. Such starches may be used for a variety of industrial applications including food products, personal care products, cleansers, liquid detergents and fabric softeners, oil-well drilling, and paints and allow for easier processing of such products.

DETAILED DESCRIPTION OF THE INVENTION

The present invention is directed to cold water swellable starches exhibiting delayed viscosity development, preparation and use thereof. The cold water swellable starches are prepared using methods known in the art and then are compacted. These starches provide all the advantages of CWS starch, including texture, heavy body, glossy sheen, and viscosity. However, the rate of hydration may be controlled to delay viscosity development and reduce lump formation. Such starches may be used for a variety of industrial applications including food products, personal care products, cleansers, liquid detergents and fabric softeners, oil-well drilling, and paints and allow for easier processing of such products.

All starches and flours (hereinafter "starch") may be suitable for use as a base material herein and may be derived from any native source. A native starch or flour as used herein, is one as it is found in nature. Also suitable are starches and flours derived from a plant obtained by breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose. Particularly suitable bases include waxy starches.

Conversion products derived from any of the starches, including fluidity or thin-boiling starches prepared by oxidation, enzyme conversion, acid hydrolysis, heat and or acid dextrinization, thermal and or sheared products may also be useful herein.

Chemically modified starches may also be used. Such chemical modifications are intended to include without limitation crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986).

Physically modified starches, such as thermally-inhibited starches described in the family of patents represented by WO 95/04082, may also be suitable for use herein.

Any starch or starch blends having suitable properties for use herein may be purified, either before or after any modification or treatment, by any method known in the art to remove starch off flavors, odors, or colors that are native to the starch or created during processing. Suitable purification processes for treating starches are disclosed in the family of patents represented by EP 554 818 (Kasica, et al.). Alkali washing techniques are also useful and described in the family of patents represented by U.S. Pat Nos, 4,477,480 (Seidel) and 5,187,272 (Bertalan et al.).

The starches must be made cold water swellable either before or after other treatments or modifications, if any, using methods known in the art. Cold water swellable starch is intended to mean a pregelatinized starch. The pregelatinized starches of the present invention may be either granular or non-granular.

Granular pregelatinized starches have retained their granular structure but lost their polarization crosses. They are pregelatinized in such a way that a majority of the starch granules are swollen, but remain intact. Exemplary processes for preparing pregelatinized granular starches are disclosed in U.S. Pat. Nos. 4,280,851; 4,465,702; 5,037,929; and 5,149,799, the disclosures of which are incorporated by reference.

Pregelatinized non-granular starches and flours have also lost their polarization crosses and have become so swollen that the starches have lost their granular structure and broken into fragments. They can be prepared according to any of the known physical, chemical or thermal pregelatinization processes that destroy the granule such as drum drying, extrusion, or jet-cooking. See U.S. Pat. Nos. 1,516,512; 1,901,109; 2,314,459; 2,582,198; 2,805,966; 2,919,214; 2,940,876; 3,086,890; 3,133,836; 3,137,592; 3,234,046; 3,607,394; 3,630,775; and 5,131,953, the disclosures of which are incorporated by reference.

In one treatment for making the starch cold water swellable, the starch may be pregelatinized by simultaneous cooking and spray drying such as in U.S. Pat. No. 5,149,799, the contents of which are hereby incorporated by reference as if set forth herein in its entirety. Alternately, other methods which are known to those skilled in the art for making the starches cold water swellable may be used, including without limitation those which use drum drying. Conventional procedures for pregelatinizing starch are known to those skilled in the art are also described for example in Chapter XXII- "Production and Use of Pregelatinized Starch", *Starch: Chemistry and Technology*, Vol. III- Industrial Aspects, R. L. Whistler and E. F. Paschall, Editors, Academic Press, New York 1967.

The only limitation is that the starch may not be modified or treated in any way which will prevent it from being further processed to render it cold water swellable. Particularly suitable starches include stabilized, crosslinked starches, more particularly those stabilized with propylene oxide and crosslinked with phosphorus oxychloride or those stabilized with acetic anhydride and crosslinked with adipic acid.

The resultant starches are substantially CWS. Although the CWS starches may be of any percent moisture convenient to compact, particularly suitable starches have a moisture level of from about 2 to about 20%, more particularly from about 6 to about 12%, by weight. The moisture of the CWS starch is best controlled during the process of pregelatinization, for example during spray or drum drying. However, the starch moisture may be adjusted after pregelatinization using methods known in the art, such as exposure to different relative humidities.

The CWS starches may be compacted using any means known in the art. A particularly useful method of compacting is by feeding the CWS starch powder through a roller compactor, such as a Chilsonator. Another particularly useful method of compacting is by extrusion. When extrusion is used, the starch may be pregelatinized and compacted during the same process.

Optionally, the particle size of the compacted CWS starches may be reduced by methods known in the art such as milling. The particle size distribution of the starches may also be optionally narrowed using methods known in the art such as sieving.

The resultant starches have the advantages of non-compacted CWS starches, including substantially the same texture, heavy body, glossy sheen, and viscosity. However, they do not readily hydrate or disperse in solution. Further, they have the added advantages of not forming lumps when added to water or a solution and are easy to handle as they pour well, without significant bridging.

As the compacted CWS starches do not readily hydrate in solution, the rate of viscosity development is significantly slower than that of non-compacted CWS starches, particularly in cold water. This is particularly advantageous during processing of various compositions as it allows for ease of a variety of processing steps such as pumping, mixing, adding other ingredients, and homogenizing due to the low initial viscosity. However, the viscosity does build to substantially the same final viscosity as when a non-compacted CWS starch is used.

The compacted CWS starches have a bulk density of at least about 0.45, more particularly at least about 0.45, most particularly at least about 0.50 g/cc and no more than about 0.70, particularly no more than about 0.65, most particularly no more than 0.60 g/cc. In general, large and small particle sizes by weight should be limited. Particularly suitable are those starches having less than about 20%, more particularly less than about 5%, most particularly less than about 1% of the particles greater than 2.00 mm (US 10 sieve). Also particularly suitable are those starches having less than about 60%, more particularly less than about 40%, most particularly less than about 20% smaller than 0.106 mm (US 140 sieve).

By controlling the bulk density and particle size distribution of the compacted CWS starches, the viscosity development may also be controlled. In general, the higher the bulk density the slower the viscosity development and the greater the particle sizes the slower the viscosity development. One major exception to this is if the starch "particle" becomes brittle and/or develops cracks which will contribute to faster hydration. One skilled in the art can control these two parameters using techniques known in the art to adjust the rate of the viscosity development to best suit processing needs. For example, exerting greater pressure on the gap rollers in a Chilsonator generally results in a higher the bulk density.

Viscosity development of the compacted CWS starch is generally slow. Although the viscosity develops over time, the rate may be advanced by shear or heat. However, heat is not necessary to develop the full viscosity.

In an aqueous solution containing 8.5% solids at ambient temperature and constant mixing at low shear, particularly suitable starches are those having a viscosity at two minutes (t=0 at addition of the starch) which is less than about 50%, more particularly less than about 35%, most particularly less than about 25% of the viscosity at 30 minutes. Low shear, as defined herein, is intended to mean no greater than that achieved at speed four on a commercially available Kitchen-Aid mixer model # KSM5 with a paddle attachment.

The resultant starches may also have the added advantage over non-compacted CWS starches of reduced lump formation in both hot and cold water. In particular, in hot water lump formation is reduced by at least about 20%, particularly by at least 40%, more particularly by at least 60%, most particularly by at least 75% by weight, compared to the non-compacted CWS starch.

The resultant starches are useful in a variety of industrial applications including food products, personal care products, cleansers, liquid detergents and fabric softeners, oil-well drilling, and paints.

Food products is intended to include both foods and beverages, including broths and soups, salad dressings and mayonnaises, sauces and gravies, coating materials such as for snack foods, yogurts, puddings and mousses, and tomato products such as ketchups, sauces, and pastes.

Personal care products is intended to include shower gels, mousses, creams, lotions and salves, shampoos and cream rinses, toothpastes, deodorants and antiperspirants.

The resultant compacted CWS starch may be used at any level desired, the amount being dependent upon the desired viscosity of the product and the CWS starch which is compacted. In general, the starch will be used at substantially the same level as would the non-compacted CWS starch and these amounts are known by those skilled in the art, particularly from about 0.1 to 50%, more particularly from about 1 to 35%, most particularly from about 5 to 20% by weight of the composition.

In foods, the starch is typically used in an amount of from about 0.01 to about 35%, particularly from about 0.1 to about 10%, more particularly from about 2 to about 6%, by weight of the food product. In detergents, the starch is typically used in an amount of from about 0.5 to about 50%, particularly from about 1 to about 50%, more particularly from about 2.5 to about 30% by weight percent of the composition.

EXAMPLES

The following examples are presented to further illustrate and explain the present invention and should not be taken as limiting in any regard. All percents used are on a weight/weight basis.

The following tests were used in the examples.

Viscosity—The Development of Viscosity was Measured Using a RVT Brookfield Rheometer.

For starch solution in cold water—About thirty-four grams of sample were poured into the mixer bowl of a Sunbeam Mix Master containing three-hundred sixty-six mls of water at ambient temperature. The starch was added over a period of one minute under agitation at speed 1. Mixing was continued at speed 1 for a further 15 minutes. At preset intervals, 2, 10 and 15 minutes, two hundred mls were poured into a 250 ml beaker and a viscosity reading was taken using the Brookfield rheometer and an appropriate spindle. A reading was taken after three revolutions while the sample was then replaced in the mixer bowl. A "final" viscosity was taken after mixing the starch solution for three minutes at speed 3.

For starch solution in hot water—About 5 grams of a starch sample were dumped into a 250 ml breaker containing 100 mls of near boiling water (~95° C.). The starch-water mixture was stirred with a standard glass stir rod for 1 minute at a moderate rate (~120–140 cycles/minute), then allowed to stand untouched for an additional 30 seconds. The mixture was then immediately poured through a tared sieve having ~20 openings/inch to catch any lumps not fully dispersed. A gross weight of the sieve was recorded and a net weight of the lumps determined. Minimal lump formation was indicative of a starch that was more completely and easily dispersed in water.

For salad dressing—The Brookfield was set up in the heliopath mode with the C-bar at 10 rpm. The C-bar was placed immediately below the surface of the dressing prior to turning on the instrument. After one revolution, a reading was taken. This was repeated three times and the average recorded.

Bulk Density—The bulk density of the products were measured using a balance and a graduated 100 ml (cc) cylinder which has been cut off at the 100 ml graduation mark. The sample was poured into the cylinder allowing any excess material to overflow. The top of the cylinder was scraped with a straight edge spatula and the net weight of the sample was determined.

Particle Size Distribution—The particle size distribution was determined by use of a stack of sieves of known mesh size. Fifty grams of sample were placed on the top sieve. The sieves were subjected to a uniform rate of circular and tapping motion for fifteen minutes on a Tyler Ro-Tap Sieve Shaker. Material having a particle size larger than the opening in a specific sieve was retained and weighed. Material which passed through all the sieves was also weighed. All mesh sizes are reported in US Sieve Numbers.
10=2.00 mm
20=0.841 mm
40=0.420 mm
100=0.149 mm
140=0.106 mm
The amount of material which was retained by the sieve is reported as + and the amount of material which pass ed through the sieve is reported as −.

Example 1

Preparation of Compacted CWS Starch and ComDarison with Non-compacted and Aaglomerated CWS Starch Waxy corn starch was stabilized with propylene oxide, crosslinked with phosphorus oxychloride, and spray dried using techniques known in the art to produce a CWS starch with a bulk density of 0.51 g/cc. The starch sample was then split. Half the starch was agglomerated using standard spray drying methods known in the art to a bulk density of 0.27 g/cc. The other half of the starch was compacted using a Chilsonator Model IR 520 (commercially available from the Fitzpatrick Company, South Plainfield, N.J.) to a bulk density of 0.52 g/cc using the following conditions:

| Pressure | 1000 psi |
|---|---|
| Roller Gap | 0.055 inches |
| Roller Speed | 7 rpm |

The particle size distribution of the starches is shown below.

| Sample | +10 Mesh (%) | +20 Mesh (%) | +40 Mesh (%) | +140 Mesh (%) | −140 Mesh (%) |
|---|---|---|---|---|---|
| without compaction | 0 | 0 | 1 | 17 | 82 |
| with agglomeration | 0 | 1 | 15 | 76 | 8 |
| with compaction | 0 | 16 | 40 | 35 | 9 |

Example 2

Viscosity Development Using Aaclomerated and Compacted Cold Water Swellable Starch The viscosity development of starch solutions were compared using the cold water swellable starch of Example 1 which had either been agglomerated using techniques known in the art or compacted as described in Example 1. The starch was added to water at 8.5% with constant stirring and the viscosity was determined. The results are shown below.

| Sample | Viscosity (at 2 min) | Viscosity (at 10 min) | Viscosity (at 15 min) | Final Viscosity (after mixing 3 min.) |
|---|---|---|---|---|
| with agglomeration | 34,000 | 36,000 | 34,000 | 36,000 |
| with compaction | 2,400 | 19,500 | 34,000 | 32,000 |

Example 3

Comparison of Viscosity DeveloDment for Compacted Cold Water Swellable Starch With Different Bulk Densities and Particle Size Distributions The CWS starch of Example 1 was compacted to different bulk densities and particle size distributions as shown below:

| Sample | Bulk Density (g/cc) | +10 Mesh (%) | +20 Mesh (%) | +40 Mesh (%) | +140 Mesh (%) | −140 Mesh (%) |
|---|---|---|---|---|---|---|
| 3a | 0.59 | 0 | 45 | 37 | 4 | 14 |
| 3b | 0.56 | 0 | 12 | 42 | 27 | 19 |
| 3c | 0.40 | 0 | 0 | 0 | 76 | 24 |

The viscosity of each sample was determined over time and the results are shown below.

| Sample | Viscosity (at 2 min) | Viscosity (at 10 min) | Viscosity (at 15 min) | Final Viscosity (after mixing 3 min.) |
|---|---|---|---|---|
| 3a | 1,800 | 27,500 | 56,000 | 60,000 |
| 3b | 13,400 | 54,000 | 70,000 | 64,000 |
| 3c | 29,000 | 60,000 | 71,000 | 70,000 |

Example 4

Viscosity Development of Stabilized Crosslinked Compacted Cold Water Swellable Starch Waxy corn starch was stabilized with acetic acid, crosslinked with adipic acid, and spray dried using techniques known in the art, and compacted as in example 1 to a bulk density of 0.50. The particle size distribution of the starch is shown below:

| Sample | +10 Mesh (%) | +20 Mesh (%) | +40 Mesh (%) | +140 Mesh (%) | −140 Mesh (%) |
|---|---|---|---|---|---|
| compacted CWS | 0 | 14 | 42 | 30 | 14 |

The viscosity was determined and the results are shown below:

| Sample | Viscosity (at 2 min) | Viscosity (at 10 min) | Viscosity (at 15 min) | Final Viscosity (after mixing 3 min.) |
|---|---|---|---|---|
| compacted CWS | 2,100 | 15,500 | 26,000 | 31,000 |

Example 5

Viscosity Development of a Tapioca Cold Water Swellable Starch

Tapioca starch was stabilized with propylene oxide, crosslinked with phosphorus oxychloride, and spray dried using techniques known in the art to produce a CWS starch. The starch was then compacted using a Chilsonator Model IR 520 (commercially available from the Fitzpatrick Company, South Plainfield, N.J.) to a bulk density of 0.61 and a particle distribution as shown below:

| Sample | +10 Mesh (%) | +20 Mesh (%) | +40 Mesh (%) | +140 Mesh (%) | −140 Mesh (%) |
|---|---|---|---|---|---|
| compacted CWS | 0 | 32 | 33 | 23 | 12 |

The viscosity was determined and the results are shown below:

| Sample | Viscosity (at 2 min) | Viscosity (at 10 min) | Viscosity (at 15 min) | Final Viscosity (after mixing 3 min.) |
|---|---|---|---|---|
| compacted CWS | 11,400 | 21,000 | 30,000 | 34,000 |

Example 6

Preparation of Salad Dressing Using Compacted CSW Starch

| | Ingredient | Weight Percent |
|---|---|---|
| A. | Sugar | 11.90 |
| | CSW Starch of Example 1 | 3.50 |
| | Salt | 1.37 |
| | Spices | 0.58 |
| B. | Water | 31.90 |
| | Vinegar | 7.23 |
| | Egg Yolk | 5.83 |
| | Oil | 37.69 |

The dry ingredients (A) were mixed together thoroughly. The liquid ingredients (B) were mixed in a separate container. The dry ingredients were slowly added to the liquids while mixing at a medium speed for three minutes. (Viscosity 1) The egg yolk was added and the mixture was further blended for two minutes. The oil was then slowly added while mixing for three minutes. (Viscosity 2) The resultant mixture was passed through a colloid mill with a gap of 40/1000 inches (10 mm) to develop the final emulsion.
(Viscosity 3)

| Sample | Viscosity 1 | Viscosity 2 | Viscosity 3 |
|---|---|---|---|
| without compaction | 28,000 | 35,000 | 35,000 |
| with agglomeration | 31,000 | 40,000 | 34,000 |
| with compaction | 1,400 | 12,000 | 31,000 |

Example 7

Compacted CWS Starch Prepared by Extrusion and Viscosity Thereof

Native potato starch was processed in a twin screw extruder. The extruder was a Werner and Pfleiderer ZSK30 co-rotating unit (Ramsey, N.J.) having a UD (Length to Diameter) ratio of 15:1. The starch powder was fed directly into the extruder at a moisture content of 17%. Additional moisture was added to the barrel section immediately after the feed zone using a piston pump to bring the total moisture content to approximately 28%. External heat of 120° C. was applied to the barrels using Mokon heat exchanger units. The extrudate was recovered in the form of two cylindrical ropes approximately 5 mm in diameter. The ropes were oven dried at 40° C. and ground using an air classifying mill (Prater Industries, Chicago, Ill.). The milled powder was separated in particle size fraction using vibratory screening techniques to yield the following distributions:

| Samples | −40/+100 Mesh | −60/100+ Mesh | −80/+100 Mesh |
|---|---|---|---|
| Extruded Potato Starch | X | | |
| Extruded Potato Starch | | X | |
| Extruded Potato Starch | | | X |

The above products were evaluated at 6% solids using a Brabender, Viscoamylograph and yielded the following viscosities with time:

| Sample (Particle Size) | Viscosity (at t = 0 min) | Viscosity (at t = 10 min) | Viscosity (at t = 25 min) | Viscosity (at t = 50 min) |
|---|---|---|---|---|
| −40/+100 Ext. Potato Starch | 580 BU | 620 BU | 400 BU | 170 BU |
| −60/+100 Ext. Potato Starch | 875 BU | 850 BU | 500 BU | 240 BU |
| −80/+100 Ext. Potato Starch | 1200 BU | 920 BU | 600 BU | 260 BU |

The viscosity results show that in a constant shear environment, the initial viscosity (t = 0 min) is lower due to the larger particle size. With continued constant shear, the viscosities become more similar over time (t = 25 min).

Example 8

Preparation of Corn CWS Corn Starch as a Readily Dispersible Additive

Corn starch was extruded using conditions similar to those described in example 7. The extrudate was ground to a fine particle size and then compacted using a Chilsonator as described in example 5. This product has enhanced dispersibility in water without the formation of lumps.

Example 9

Dispersion Properties of Compacted CWS Starches in Hot Water

Several waxy corn starches were stabilized with propylene oxide or acetic anhydride and crosslinked with phosphorous oxychloride or adipic acetic dianhydride and pregelatinized using techniques known in the art to produce CWS samples. A portion of each starch sample was then compacted using techniques described in Example 1. The dispersion properties of each sample in hot water was measured to determine the effect of compaction on ease and completeness of the starch dispersing.

| Starch type | amount of lumps formed in hot water (g) | |
|---|---|---|
| | non-compacted | compacted |
| non-granular pregelatinized acetylated distarch adipate waxy corn | 7.89 | 6.0 |
| granular pregelatinized acetylated distarch phosphate waxy corn | 7.99 | 1.82 |
| granular pregelatinized hydroxypropylated distarch phosphate waxy corn | 3.75 | 1.44 |

Example 10

Effect of Roll Gap Pressure on Compacted Starch

The CWS starch of Example 1 was compacted using different roll gap pressures on the Chilsonator. The change in pressure results in varying degrees of compression which achieves differences in bulk densities and particle size distributions as shown below.

| Pressure (psi) | Bulk Density (g/cc) | +10 Mesh (%) | +20 Mesh (%) | +40 Mesh (%) | +140 Mesh (%) | −140 Mesh (%) |
|---|---|---|---|---|---|---|
| 400 | 0.48 | 0 | 0 | 7 | 73 | 20 |
| 1000 | 0.59 | 0 | 16 | 46 | 33 | 5 |

The effect of changing the roll gap pressure results in varying hydration rates as is seen in the viscosity development below.

| Pressure (psi) | Viscosity (at 2 min) | Viscosity (at 10 min) | Viscosity (at 15 min) | Final Viscosity (after mixing 3 min.) |
|---|---|---|---|---|
| 400 | 32,000 | 50,000 | 50,000 | 52,000 |
| 1000 | 3,300 | 40,000 | 44,000 | 48,000 |

We claim:

1. A compacted, cold water swellable starch wherein the starch has no polarization cross and an 8.5% by weight solids aqueous solution of the starch has a viscosity at two minutes which is no greater than about 50% of the viscosity at 30 minutes.

2. The starch of claim 1 capable of providing substantially the same textural attributes as a non-compacted cold water swellable starch.

3. The starch of claim 1, wherein the bulk density is from about 0.40 to about 0.70 g/cc.

4. The starch of claim 3, wherein the bulk density is from about 0.45 to about 0.65 g/cc.

5. The starch of claim 4, wherein the bulk density is from about 0.50 to about 0.60 g/cc.

6. The starch of claim 1 having less than about 20% of the particles greater than 2.00 mm (US 10 sieve) and less than about 60% of the particles smaller than 0.106 mm (US 140 sieve).

7. The starch of claim 6 having less than about 5% of the particles greater than 2.00 mm (US 10 sieve) and less than about 40% of the particles smaller than 0.106 mm (US 140 sieve).

8. The starch of claim 7 having less than about 1% of the particles greater than 2.00 mm (US 10 sieve) and less than about 20% smaller than 0.106 mm (US 140 sieve).

9. The solution of claim 1 wherein the solution has a viscosity at two minutes which is no greater than about 35% of the viscosity at 30 minutes.

10. The solution of claim 9, wherein the solution has a viscosity at two minutes which is no greater than about 25% of the viscosity at 30 minutes.

11. A process of preparing a composition comprising adding the starch of claim 1 to water.

12. The process of claim 11, which further comprises exposing the starch solution to high shear.

13. The process of claim 11, wherein the composition is a food.

14. The process of claim 13, wherein the composition is a salad dressing.

15. A process of preparing a compacted cold water swellable starch comprising compacting a cold water swellable starch.

16. The process of claim 15, wherein the compacting is by extrusion.

17. The process of claim 15, wherein the compacting is by Chilsonation.

* * * * *